US010311080B2

(12) United States Patent
Folting et al.

(10) Patent No.: US 10,311,080 B2
(45) Date of Patent: Jun. 4, 2019

(54) FILTERING AND SORTING INFORMATION

(75) Inventors: Allan Folting, Redmond, WA (US); Anatoly V. Grabar, Redmond, WA (US); Tigran Hayrapetyan, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 716 days.

(21) Appl. No.: 13/206,710

(22) Filed: Aug. 10, 2011

(65) Prior Publication Data

US 2011/0295871 A1 Dec. 1, 2011

Related U.S. Application Data

(63) Continuation of application No. 11/339,037, filed on Jan. 25, 2006, now Pat. No. 8,005,873.

(51) Int. Cl.
*G06F 16/20* (2019.01)
*G06F 16/26* (2019.01)
(Continued)

(52) U.S. Cl.
CPC .............. *G06F 16/26* (2019.01); *G06F 16/20* (2019.01); *G06F 16/9035* (2019.01);
(Continued)

(58) Field of Classification Search
CPC ........... G06F 17/30592; G06F 11/0775; G06F 11/0781; G06F 17/2247; G06F 17/246; G06F 17/30; G06F 19/363; G06F 3/0481; G06F 3/0482; G06F 13/00; G06F 17/30265; G06F 17/30418; G06F 17/30554; G06F 17/30572; G06F 17/30598; G06F 17/3082; G06F 17/30864; G06F 17/30873; G06F 17/30955; G06F 21/84; G06F 3/0484
USPC ......... 707/E17.005, E17.044, 600, 736, 803, 707/E17.001, E17.008, E17.014, E17.018, 707/E17.032, E17.059, E17.089, E17.108, 707/608, 609, 694, 705, 710, 723, 740, 707/754
See application file for complete search history.

(56) References Cited

U.S. PATENT DOCUMENTS 5,749,077 A 5/1998 Campbell
5,752,253 A 5/1998 Geymond et al.
(Continued)

*Primary Examiner* — Mark D Featherstone
*Assistant Examiner* — Diedra McQuitery
(74) *Attorney, Agent, or Firm* — Merchant & Gould

(57) ABSTRACT

Generally described, embodiments of the present invention provide the ability to sort and/or filter information contained in a summary table based on related information that may not be included in the summary table. According to one aspect, a computer-readable medium having computer executable components for filtering or sorting information displayed in a summary table is provided. Included in the computer executable medium is a category receipt and identification component configured to receive selections of categories and identify related categories contained in a dataset represented by the summary table. Also included in the computer-readable medium is a filtering component and a sorting component, each configured to control the structure and criteria upon which information contained in a category displayed in the data summary table may be filtered or sorted.

19 Claims, 12 Drawing Sheets

(51) Int. Cl.

| | |
|---|---|
| ***G06F 16/9035*** | (2019.01) |
| *G06F 16/2458* | (2019.01) |
| *G06F 16/22* | (2019.01) |
| *G06F 16/9535* | (2019.01) |

(52) U.S. Cl.

CPC .......... *G06F 16/22* (2019.01); *G06F 16/2465* (2019.01); *G06F 16/9535* (2019.01)

(56) References Cited

U.S. PATENT DOCUMENTS

| | | | | |
|---|---|---|---|---|
| 6,205,451 | B1 | 3/2001 | Norcott et al. | |
| 6,626,959 | B1 | 9/2003 | Moise et al. | |
| 6,738,770 | B2 | 5/2004 | Gorman | |
| 6,741,986 | B2 | 5/2004 | Cho et al. | |
| 6,750,864 | B1 * | 6/2004 | Anwar | 345/440 |
| 6,947,903 | B1 * | 9/2005 | Perry | 705/28 |
| 7,246,128 | B2 | 7/2007 | Jordahl | |
| 7,596,753 | B2 | 9/2009 | Smith et al. | |
| 7,742,981 | B2 | 6/2010 | Kemper et al. | |
| 8,005,873 | B2 | 8/2011 | Folting et al. | |
| 2002/0118192 | A1 * | 8/2002 | Couckuyt | G06F 3/0486 345/440 |
| 2002/0120604 | A1 * | 8/2002 | Labarge | G06F 16/2457 |
| 2002/0194095 | A1 | 12/2002 | Koren | |
| 2004/0163039 | A1 * | 8/2004 | Gorman | G06F 17/246 715/255 |
| 2004/0225595 | A1 | 11/2004 | Nolan | |
| 2005/0038631 | A1 * | 2/2005 | Steinke | E21B 10/00 702/182 |
| 2005/0039033 | A1 * | 2/2005 | Meyers | G06F 16/2423 713/193 |
| 2005/0234888 | A1 * | 10/2005 | Bailey | G06Q 30/0601 |
| 2006/0218156 | A1 * | 9/2006 | Schechinger et al. | 707/100 |
| 2006/0224568 | A1 * | 10/2006 | Debrito | G06F 16/2428 |
| 2007/0033545 | A1 | 2/2007 | Haynes et al. | |
| 2007/0061369 | A1 | 3/2007 | Folting et al. | |
| 2007/0174245 | A1 | 7/2007 | Folting et al. | |

* cited by examiner

100

101 103 105 106 107 109 111 113 115 117 119

| PRODUCT NAME | CLASS | MODEL SERIES | MODEL | COLOR | DAYS TO MFG. | MFG. COST | DEALER PRICE | VOLUME | PROFIT | END DATE |
|---|---|---|---|---|---|---|---|---|---|---|
| BIKES | MOUNTAIN | 6000 | 6001 | BLACK | 84 | $400.00 | $715.71 | 1,907 | $601,947.57 | January 15, 2006 |
| BIKES | STREET | 3000 | 3001 | BLACK | 67 | $486.60 | $679.99 | 3,626 | $701,317.78 | March 10, 2007 |
| BIKES | MOUNTAIN | 6000 | 6002 | SILVER | 87 | $625.74 | $749.99 | 566 | $70,295.01 | March 1, 2006 |
| BIKES | MOUNTAIN | 1000 | 1003 | BLUE | 73 | $200.00 | $477.27 | 2,216 | $614,337.13 | May 1, 2006 |
| BIKES | MOUNTAIN | 9000 | 9003 | BLUE | 76 | $265.19 | $1,656.63 | 1,369 | $1,904,875.39 | January 1, 2008 |
| BIKES | STREET | 9000 | 9004 | RED | 59 | $598.97 | $1,163.52 | 984 | $555,762.13 | December 31, 2006 |
| BIKES | STREET | 1000 | 1004 | RED | 24 | $223.87 | $306.90 | 4,130 | $342,925.56 | November 11, 2011 |
| BIKES | STREET | 2000 | 2005 | WHITE | 79 | $386.75 | $506.84 | 1,730 | $207,724.51 | January 1, 2009 |
| BIKES | STREET | 2000 | 2006 | GREEN | 77 | $389.50 | $500.00 | 4,080 | $450,890.47 | January 15, 2008 |
| AUTO | SEDAN | 500 | 502 | SILVER | 37 | $31,876.00 | $50,661.41 | 222 | $4,176,439.73 | July 4, 2006 |
| AUTO | WAGON | 100 | 102 | SILVER | 68 | $12,987.00 | $21,853.95 | 4,497 | $39,874,919.75 | August 4, 2007 |
| AUTO | SPORT | 300 | 303 | BLUE | 38 | $33,222.00 | $48,729.73 | 1,389 | $21,539,524.29 | September 23, 2010 |
| AUTO | SPORT | 700 | 701 | BLACK | 57 | $90,500.00 | $95,827.38 | 1,973 | $10,510,016.73 | July 16, 2009 |
| AUTO | SPORT | 300 | 305 | WHITE | 19 | $30,333.00 | $41,786.72 | 1,240 | $14,199,651.58 | January 15, 2006 |
| AUTO | SPORT | 100 | 105 | WHITE | 0 | $11,000.00 | $33,333.33 | 1,552 | $34,669,151.83 | January 15, 2006 |
| AUTO | SPORT | 500 | 507 | YELLOW | 23 | $45,500.00 | $66,771.37 | 1,689 | $35,928,768.83 | February 2, 2006 |
| AUTO | SEDAN | 700 | 708 | GREY | 46 | $60,000.00 | $82,749.86 | 4,384 | $99,738,035.01 | February 14, 2009 |
| AUTO | SEDAN | 100 | 106 | GREEN | 52 | $10,000.00 | $19,999.99 | 2,456 | $24,560,462.53 | January 30, 2007 |
| AUTO | SEDAN | 500 | 503 | BLUE | 37 | $60,000.00 | $64,829.12 | 1,911 | $9,228,496.26 | August 1, 2015 |
| AUTO | SEDAN | 300 | 309 | ORANGE | 88 | $32,680.00 | $45,750.00 | 4,085 | $53,391,909.20 | August 21, 2008 |
| AUTO | MOUNTAIN | 10000 | 10001 | BLACK | 13 | $20,000.00 | $29,995.99 | 562 | $5,621,671.48 | August 22, 2009 |
| AUTO | MOUNTAIN | 30000 | 30003 | BLUE | 77 | $27,775.00 | $35,795.99 | 4,315 | $34,610,755.86 | January 15, 2006 |
| AUTO | MOUNTAIN | 70000 | 70008 | GREY | 76 | $88,500.00 | $99,971.85 | 3,897 | $44,705,057.30 | January 15, 2006 |
| AUTO | MOUNTAIN | 30000 | 30004 | RED | 9 | $30,000.00 | $44,703.14 | 2,848 | $41,868,015.65 | January 15, 2006 |

| PROFIT SUMMARY | | |
|---|---|---|
| | | |
| Sum of PROFIT | | |
| PRODUCT NAME | MODEL SERIES | Total |
| AUTO | 100 | $104,726,205.60 |
| | 300 | $165,609,856.57 |
| | 500 | $49,333,704.82 |
| | 700 | $154,953,109.04 |
| AUTO Total | | $474,622,876.03 |
| BIKES | 1000 | $957,262.69 |
| | 2000 | $658,614.98 |
| | 3000 | $701,317.78 |
| | 6000 | $672,242.58 |
| | 9000 | $2,460,637.52 |
| BIKES Total | | $5,450,075.55 |
| Grand Total | | $480,072,951.58 |

| MOUNTAIN CLASS PRODUCTS - PROFIT SUMMARY | | |
|---|---|---|
| | | |
| Sum of PROFIT | | |
| PRODUCT NAME | MODEL SERIES | Total |
| AUTO | 100 | $5,621,671.48 |
| | 300 | $76,478,771.50 |
| | 700 | $44,705,057.30 |
| AUTO Total | | $126,805,500.29 |
| BIKES | 1000 | $614,337.13 |
| | 6000 | $672,242.58 |
| | 9000 | $1,904,875.39 |
| BIKES Total | | $3,191,455.10 |
| Grand Total | | $129,996,955.38 |

AUTO PROFIT SUMMARY

Sum of PROFIT

| PRODUCT NAME | CLASS | MODEL | COLOR | Total |
|---|---|---|---|---|
| AUTO | MOUNTAIN | 10001 | BLACK | $5,621,671.48 |
| | | 10001 Total | | $5,621,671.48 |
| | | 30003 | BLUE | $34,610,755.86 |
| | | 30003 Total | | $34,610,755.86 |
| | | 30004 | RED | $41,868,015.65 |
| | | 30004 Total | | $41,868,015.65 |
| | | 70008 | GREY | $44,705,057.30 |
| | | 70008 Total | | $44,705,057.30 |
| | MOUNTAIN Total | | | $126,805,500.29 |
| | SEDAN | 106 | GREEN | $24,560,462.53 |
| | | 106 Total | | $24,560,462.53 |
| | | 309 | ORANGE | $53,391,909.20 |
| | | 309 Total | | $53,391,909.20 |
| | | 502 | SILVER | $4,176,439.73 |
| | | 502 Total | | $4,176,439.73 |
| | | 503 | BLUE | $9,228,496.26 |
| | | 503 Total | | $9,228,496.26 |
| | | 708 | GREY | $99,738,035.01 |
| | | 708 Total | | $99,738,035.01 |
| | SEDAN Total | | | $191,095,342.73 |
| | SPORT | 105 | WHITE | $34,669,151.83 |
| | | 105 Total | | $34,669,151.83 |
| | | 303 | BLUE | $21,539,524.29 |
| | | 303 Total | | $21,539,524.29 |
| | | 305 | WHITE | $14,199,651.58 |
| | | 305 Total | | $14,199,651.58 |
| | | 507 | YELLOW | $35,928,768.83 |
| | | 507 Total | | $35,928,768.83 |
| | | 701 | BLACK | $10,510,016.73 |
| | | 701 Total | | $10,510,016.73 |
| | SPORT Total | | | $116,847,113.26 |
| | WAGON | 102 | SILVER | $39,874,919.75 |
| | | 102 Total | | $39,874,919.75 |
| | WAGON Total | | | $39,874,919.75 |
| AUTO Total | | | | $474,622,876.03 |
| Grand Total | | | | $474,622,876.03 |

Figure 6:
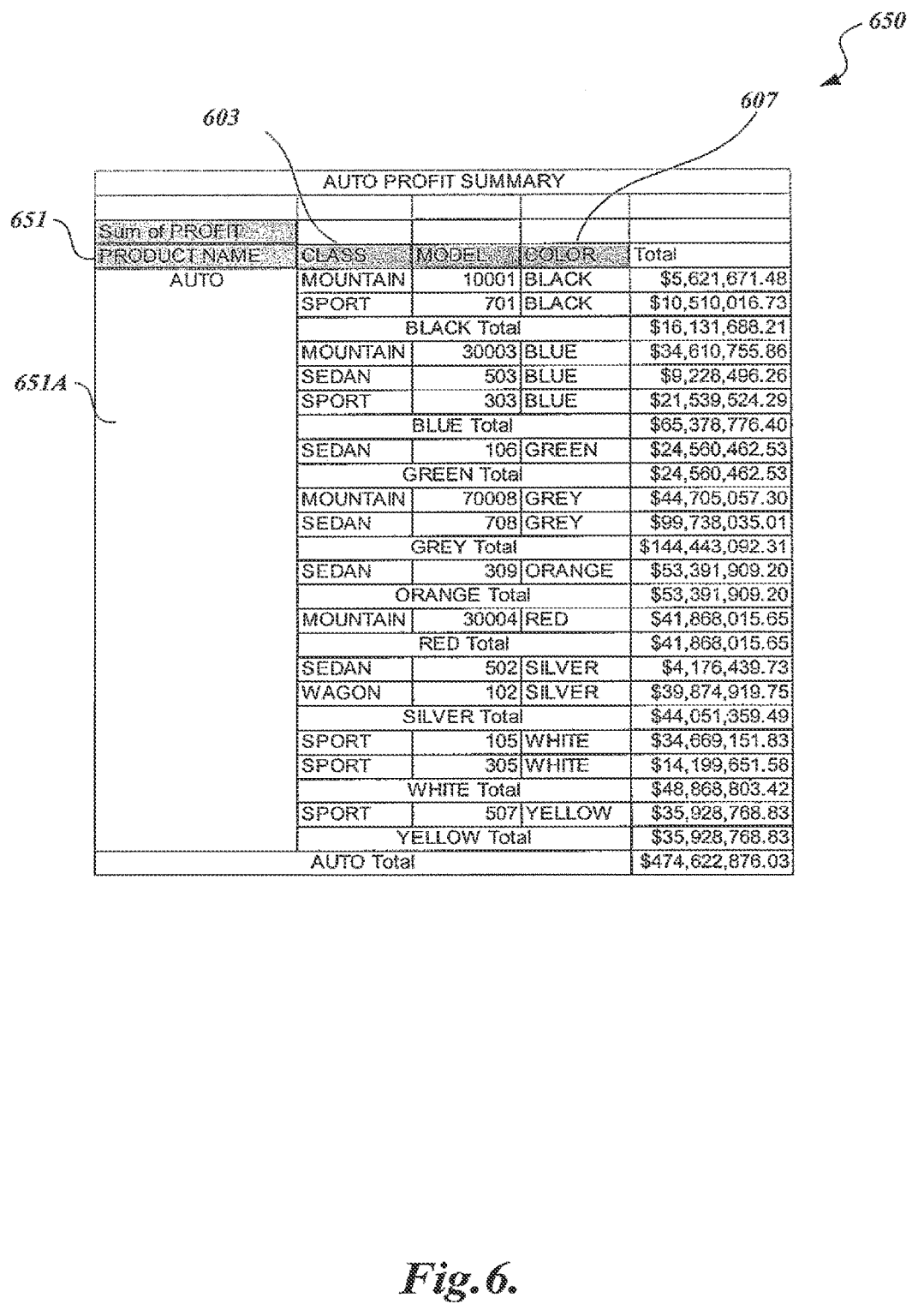

| AUTO PROFIT SUMMARY | | | | |
|---|---|---|---|---|
| | | | | |
| Sum of PROFIT | | | | |
| PRODUCT NAME | CLASS | MODEL | COLOR | Total |
| AUTO | MOUNTAIN | 10001 | BLACK | $5,621,671.48 |
| | SPORT | 701 | BLACK | $10,510,016.73 |
| | BLACK Total | | | $16,131,688.21 |
| | MOUNTAIN | 30003 | BLUE | $34,610,755.86 |
| | SEDAN | 503 | BLUE | $9,228,496.26 |
| | SPORT | 303 | BLUE | $21,539,524.29 |
| | BLUE Total | | | $65,378,776.40 |
| | SEDAN | 106 | GREEN | $24,560,462.53 |
| | GREEN Total | | | $24,560,462.53 |
| | MOUNTAIN | 70008 | GREY | $44,705,057.30 |
| | SEDAN | 708 | GREY | $99,738,035.01 |
| | GREY Total | | | $144,443,092.31 |
| | SEDAN | 309 | ORANGE | $53,391,909.20 |
| | ORANGE Total | | | $53,391,909.20 |
| | MOUNTAIN | 30004 | RED | $41,868,015.65 |
| | RED Total | | | $41,868,015.65 |
| | SEDAN | 502 | SILVER | $4,176,439.73 |
| | WAGON | 102 | SILVER | $39,874,919.75 |
| | SILVER Total | | | $44,051,359.49 |
| | SPORT | 105 | WHITE | $34,669,151.83 |
| | SPORT | 305 | WHITE | $14,199,651.58 |
| | WHITE Total | | | $48,868,803.42 |
| | SPORT | 507 | YELLOW | $35,928,768.83 |
| | YELLOW Total | | | $35,928,768.83 |
| AUTO Total | | | | $474,622,876.03 |

| AUTO PROFIT SUMMARY | | | | |
|---|---|---|---|---|
| Sum of PROFIT | | | | |
| PRODUCT NAME | CLASS | MODEL | COLOR | Total |
| AUTO | MOUNTAIN | 10001 | BLACK | $5,621,671.48 |
| | | 10001 Total | | $5,621,671.48 |
| | | 30003 | BLUE | $34,610,755.86 |
| | | 30003 Total | | $34,610,755.86 |
| | | 70008 | GREY | $44,705,057.30 |
| | | 70008 Total | | $44,705,057.30 |
| | | 30004 | RED | $41,868,015.65 |
| | | 30004 Total | | $41,868,015.65 |
| | MOUNTAIN Total | | | $126,805,500.29 |
| | SEDAN | 503 | BLUE | $9,228,496.26 |
| | | 503 Total | | $9,228,496.26 |
| | | 106 | GREEN | $24,560,462.53 |
| | | 106 Total | | $24,560,462.53 |
| | | 708 | GREY | $99,738,035.01 |
| | | 708 Total | | $99,738,035.01 |
| | | 309 | ORANGE | $53,391,909.20 |
| | | 309 Total | | $53,391,909.20 |
| | | 502 | SILVER | $4,176,439.73 |
| | | 502 Total | | $4,176,439.73 |
| | SEDAN Total | | | $191,095,342.73 |
| | SPORT | 701 | BLACK | $10,510,016.73 |
| | | 701 Total | | $10,510,016.73 |
| | | 303 | BLUE | $21,539,524.29 |
| | | 303 Total | | $21,539,524.29 |
| | | 105 | WHITE | $34,669,151.83 |
| | | 105 Total | | $34,669,151.83 |
| | | 305 | WHITE | $14,199,651.58 |
| | | 305 Total | | $14,199,651.58 |
| | | 507 | YELLOW | $35,928,768.83 |
| | | 507 Total | | $35,928,768.83 |
| | SPORT Total | | | $116,847,113.26 |
| | WAGON | 102 | SILVER | $39,874,919.75 |
| | | 102 Total | | $39,874,919.75 |
| | WAGON Total | | | $39,874,919.75 |
| AUTO Total | | | | $474,622,876.03 |

*Fig. 7.*

FILTERING AND SORTING INFORMATION

RELATED APPLICATIONS

This application is a Continuation of co-pending U.S. application Ser. No. 11/339,037 entitled "Filtering and Sorting Information" filed Jan. 25, 2006, which is incorporated herein by reference.

BACKGROUND OF THE INVENTION

Data summary tables can be used to analyze large amounts of data. A data summary table provides an efficient way to display and summarize data supplied by a database program or in a data listing of a spreadsheet. A user can select fields of the data to include within filter, row, column, or data regions of the data summary table and can choose parameters such as the sum, variance, count, and standard deviation to be displayed for selected data fields. Data in a database that can be queried from within a spreadsheet program, or spreadsheet data including lists, can be analyzed in a data summary table.

Although a data summary table is designed to efficiently and intuitively analyze data, the creation of a data summary table itself can be challenging for novice users. For example, some programs provide wizards that assist the user in creating a data summary table. While these wizards may be helpful in creating an initial data summary table, wizards cannot easily be used to modify the displayed table once created and/or organize the displayed data based on information not included in the data summary table.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, embodiments of the present invention provide the ability to sort and/or filter information contained in a summary table based on related information that may not be included in the summary table. In one aspect, a method for filtering information based on related information is provided. The method includes receiving a selection of a displayed category of information that a user desires to have filtered. Upon receipt of a displayed category, all related categories are identified and provided to a user for selection. In particular, a user may select which related category is to be used to complete the filter. In addition to specifying a related category upon which the filtering is to be based, a user may specify the filtering criteria, including the conditions and parameters for the filter. Upon identification of the filtering conditions and the related category upon which the filter is to be based, the selected category is filtered and only information that includes material in the related category that matches the filtering conditions is provided.

According to another aspect of the present invention, a method for sorting information displayed in a summary table is provided. Similar to filtering, information in a summary table may be sorted based upon related information. In one example, a user may specify a category displayed in the summary table to be sorted. Additionally, they may specify a related category upon which the sorting is to be based. The related category may be included in the summary table or only present in the dataset represented by the summary table. Upon identification of a related category upon which the sorting is to be based, the selected category is sorted and displayed to a user in the appropriate manner.

According to another aspect of the present invention, a computer-readable medium having computer executable components for filtering information displayed in a summary table is provided. Included in the computer-executable medium is a category receipt and identification component configured to receive selections of categories and identify related categories contained in a dataset represented by the summary table. Also included in the computer-readable medium is a filtering component configured to control the structure and criteria upon which information contained in a category displayed in the data summary table may be filtered. For example, a category displayed in the summary table may be filtered based upon information contained in an identified related category.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A is pictorial representations of a typical dataset that a user may desire to have summarized in a data summary table, in accordance with an embodiment of the present invention;

FIG. 1B is a pictorial representation of a data summary table summarizing the data included in the dataset illustrated in FIG. 1A;

FIG. 3 is a pictorial representation of a filtered summary table representing information matching the filter specified in the filter window of FIG. 2B, in accordance with an embodiment of the present invention;

FIG. 4 is a pictorial representation of a summary table providing a summary of the information contained in the dataset illustrated in FIG. 1A;

FIG. 6 is a pictorial representation of a sorted summary table, sorted based on the information provided in the sort window illustrated in FIG. 5, in accordance with an embodiment of the present invention;

FIG. 7 is a pictorial representation of a sorted summary table, sorted based on the information provided in the sort window illustrated in FIG. 5, in accordance with another embodiment of the present invention;

DETAILED DESCRIPTION

Embodiments will now be described more fully hereinafter with reference to the accompanying drawings. Embodiments disclosed herein are examples and should not be construed as limiting.

Summary tables may be generated from a set of data to aid a user in understanding the contents of the data at a higher level. In addition to providing a typical summary table, embodiments of the present invention provide the ability to organize and/or filter information displayed in a data summary table. In particular, embodiments of the present invention provide the ability for a user to filter and/or sort information displayed in a data summary table based on related information that may or may not be displayed in the data summary table.

FIG. 1A is pictorial representation of a typical spreadsheet that includes a set of data 100 that a user may desire to have summarized in a data summary table, in accordance with an embodiment of the present invention. While embodiments of the present invention will be described with respect to summarizing information contained in a spreadsheet, embodiments of the present invention are equally applicable to data contained in other forms and/or locations. For example, embodiments of the present invention may be used with data contained in a spreadsheet, a local database, a remote database, etc. For purposes of this discussion, data to be summarized and organized utilizing embodiments of the present invention will be generally referred to herein as a "dataset." It will be understood that a dataset may include one or more databases, or other sources of information, with any amount and type of data. Summary tables of a dataset may be generated in a variety of ways and any technique for generating a summary table may be utilized with embodiments of the present invention.

Referring back to FIG. 1A, the dataset 100 includes information on six categories: Product Name 101, Class 103, Model Series 105, Model 106, Color 107, Days to Manufacture (Days to Mfg.) 109, Manufacturing Cost (Mfg. Cost) 111, Dealer Price 113, Volume 115, Profit 117, and End Date 119. Information of this type may be summarized in a data summary table as illustrated in FIG. 1B. The summary table 150 in FIG. 1B provides a high level summary of the information contained in the dataset 100 (FIG. 1A). In particular, the summary table 150 provides a profit summary for the data included in the category Product Name 151, namely, Auto 151A and Bikes 151B. The profits for Auto 151A and Bikes 151B is further broken out based on the information contained in the category Model Series 155.

While summary tables, such as the one illustrated in FIG. 1B are readily generated using existing techniques, the ability to further manipulate the information provided in those summary tables is limited. However, embodiments of the present invention provide the ability for a user to filter information displayed in a summary table 150 based on information not included in the summary table.

Figure 2A:
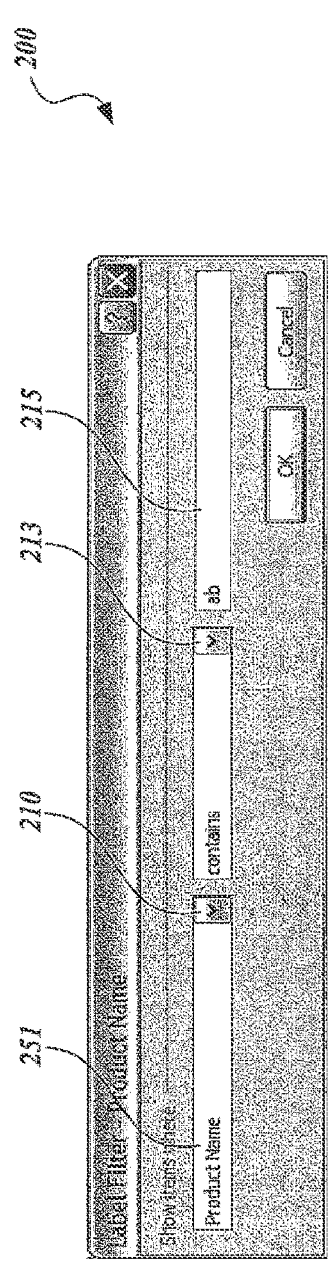
FIGS. 2A-2B are a pictorial representations of a filter window that provides the ability for a user to filter information in a data summary table based on information not included in the data summary table, in accordance with an embodiment of the present invention.

FIG. 2A is a pictorial representation of a filter window that provides the ability for a user to filter information in a data summary table based on information not included in the data summary table, in accordance with an embodiment of the present invention. In particular, embodiments of the present invention provide the ability for a user to filter information based on related information (referred to herein as "related categories"). Related categories may be automatically identified or may be manually identified by a user. For example, the category Product Name 150 may have related categories of Class 103, Model Series 105, Model 106, Color 107, Days to Manufacture 109, Manufacturing Cost 111, Dealer Price 113, Volume 115, Profit 117, and End Date 119. These categories may be automatically identified as related categories because they are headers for columns of a dataset from which the category Product Name 150 was obtained. In another embodiment, categories may be identified by tracking existing entity relationships between selected fields in a dataset with other fields from the same or different dataset. Any type and/or form of information may be identified as a related category. In one embodiment, related categories may be selected as those that contain a single item that corresponds to any one item of information from the selected category.

A user may select a category from a summary table 150, such as Product Name 151 and be provided with the filter window 200 (FIGS. 2A-2B) for use in filtering the information contained in the summary table 150. The filter window 200 allows a user to filter based on the selected category or based on any category related to the selected category. Consistent with the current example, in one embodiment, the drop down window 210 provides a user with the selected category and all related categories. For example, FIG. 2A illustrates a filter representation in which the filter will be applied to the category Product Name 251 based on information contained in that category.

Figure 2B:
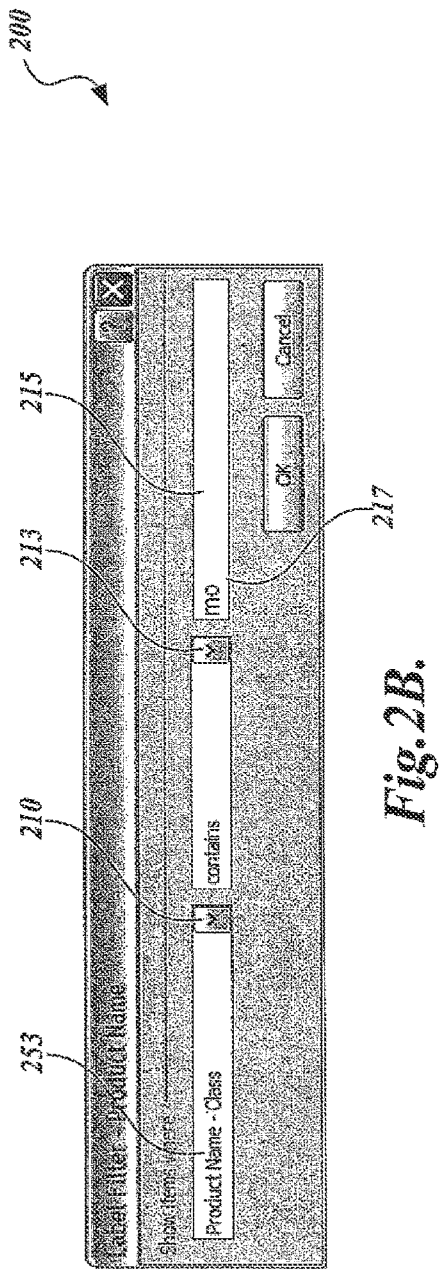

FIG. 2B illustrates a filter representation in which the filter will be applied to the category Product Name 151, based on information contained in the related category of Class 253. Selection of the drop down window 210 provides a user with a list identifying the selected category and all related categories. For example, if the selected category is Product Name 151 the list may include the following: Product Name, Product Name—Class, Product Name—Model Series, Product Name—Model, Product Name—Color, Product Name—Days to Manufacture, Product Name—Manufacturing Cost, Product Name—Dealer Price, Product Name—Volume, Product Name—Profit, and Product Name—End Date. The list of categories may include both related categories that are included in the data summary table and related categories that are not included in the data summary table.

In addition to selecting a category, or a related category for filtering, a user may specify the filtering criteria for use in performing the filtering. The filtering criteria include a filtering condition and parameters. The condition may be selected from the drop down window 213. Examples of conditions that may be used to filter summary table information include, but are not limited to: equals, does not equal, is greater than, is greater than or equal to, is less than, is less than or equal to, begins with, does not begin with, ends with, does not end with, contains, does not contain, is between, and is not between.

Parameters applied to the filter, based on the selected condition may be specified using the parameter entry window 215. Providing the search criteria and category will result in a filtering of the summary table based on that information. Referring to FIG. 2B, a user may specify to filter the category Product Name 151 included in summary table 150 based on the related category Class 253. The condition for the filter is "contains" 213 and the parameters are the characters "mo" 217. The search will result in a summary table that displays information from the category Product Name 151 that includes the characters "mo" 217 in the related category of Class 103.

FIG. 3 is a pictorial representation of a filtered summary table 350 representing information matching the filter specified in the filter window 200 of FIG. 2B, in accordance with an embodiment of the present invention. As can be seen by comparing the information in the summary table 150 with the information in the filtered summary table 350, only data from the category Product Name in which the related category of Class 103 includes the characters "mo," in this case the class of Mountain (see the dataset from FIG. 1A) is provided. Unique to this filtering, is that the information provided in the summary table 350 is filtered based on information not included in the summary table. Namely, the category Product Name 351 is filtered based on information contained in the related category of Class 103 (FIG. 1A), which is not included in the filtered summary table 350.

Referring back to FIG. 1A, only data that includes the characters "mo" (in this example "MOUNTAIN") in the category Class 103 is provided in the filtered summary table 350. Information for the Product Names of Auto 351A and Bikes 351B that include other terms that do not include "mo" in the category Class (e.g., STREET, SEDAN, WAGON, and SPORT) are not included in the filtered summary table 350. As such, the total profit displayed for the items of Auto and Bikes is different.

In addition to being able to filter information contained in a summary table, embodiments of the present invention provide the ability to sort information contained in a summary table based on related categories that are either included or not included in the summary table view.

FIG. 4 is a pictorial representation of a summary table providing a summary of the information contained in the dataset 100 (FIG. 1A). In particular, the summary table 450 provides profit summary information for the category Product Name, for those dataset entries titled "AUTO" 451A. Additionally, the summary table 450 is further organized to provide the information based on the related categories of Class 403, Model 406, and Color 407. Through interaction with the summary table 450, a user may sort the information displayed in the summary table by category based on information contained in a related category.

Figure 5:
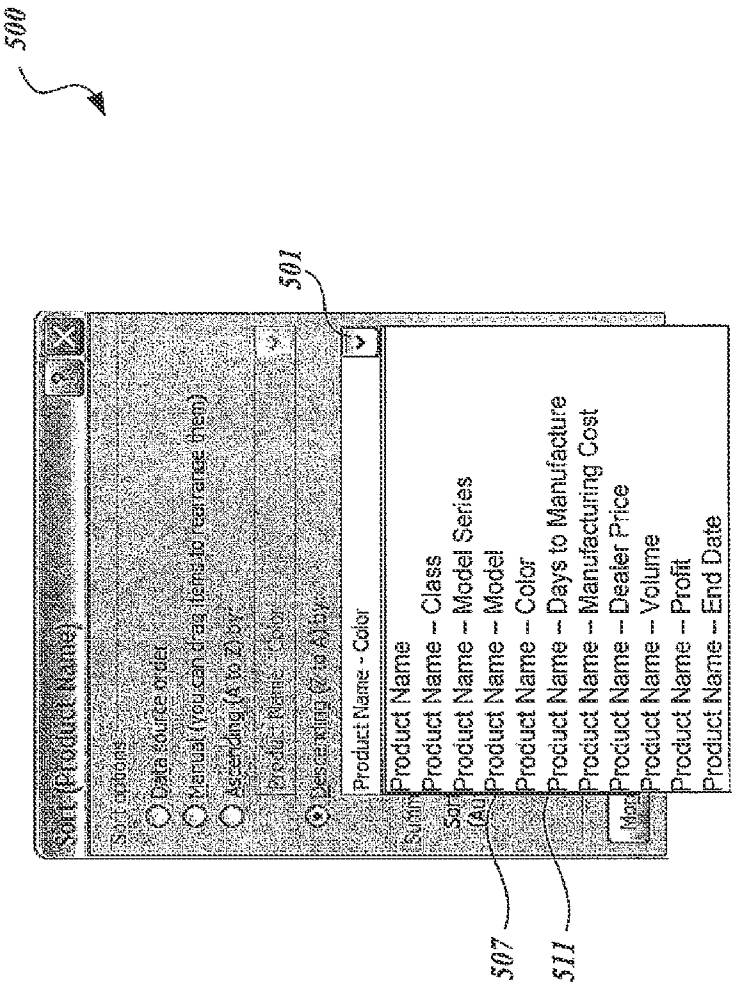
FIG. 5 is a pictorial representation of a sort window for use in sorting information contained in a summary table, in accordance with an embodiment of the present invention.

FIG. 5 is a pictorial representation of a sort window 500 for use in sorting information contained in a summary table 450, in accordance with an embodiment of the present invention. A user may select how data is to be sorted. For example, data may be sorted according to a data source order, manually, ascending, descending, etc. Any sorting technique may be used with embodiments of the present invention and those listed in FIG. 5 and described herein are provided only as illustrative, and are not intended to be limiting.

Selection of a category from the summary table 450, such as Product Name 451, will provide a drop down list 501 allowing selection of what related category is used for performing the sort. For example, if a user selects the category of Product Name 451 and desires to sort the information, they are provided with a drop down list 501 that identifies the selected category and the related categories that may be used to sort the category Product Name 451. If a user selects a different category (e.g., Class 403, Volume 415, or Color 407) included in the summary table 450, the drop down list 501 identifies the selected category and the categories related to the selected category.

Upon selection of a related category for which the sort is to be based, the information is sorted according to the specified selection. For example, a user may select to sort the category Product Name 451 based on information contained in the related category of Color 107, by selecting Product Name—Color 507 from the drop down list 501. As a result of the sort, information in the category Product Name 451 provided in the summary table 450 is sorted in descending order based on information contained in the related category Color 107.

FIG. 6 is a pictorial representation of a sorted summary table, sorted based on the information provided in the sort window 500 illustrated in FIG. 5, in accordance with an embodiment of the present invention. As can be seen by a comparison of the summary table 450 represented in FIG. 4 and the sorted summary table 650 represented in FIG. 6, the organization of the displayed information is modified based on information contained in the related category Color 607. In particular, information in the category Product Name 651 for Auto 651A is sorted in descending order based on information contained in the related category Color 607. In this embodiment, the structure of the related categories is disjoined so that the selected category Product Name 651 can be sorted based on Color 607. For example, the category of Class 603 is disjoined.

While this example is explained with a sorting utilizing a related category displayed in the summary table, as can be seen from the drop down list 501, sorting may be performed for a category in the summary table based on related categories that are not displayed in the summary table. For example, the category Product Name 451 can be sorted based on the related category of Manufacturing Costs 111, a non-displayed related category by selecting Product Name—Manufacturing Cost 511 from the drop down window 501 in the sort window 500 (FIG. 5).

Additionally, a user may select to sort categories based on multiple related categories. In such an example, the sorting is performed on a priority basis. In one example, the priority is assigned based on the order in which the categories are specified for sorting. For example, the sort and/or related category identified first may be given the first priority and each subsequent sort or related category may be sorted in the order in which it was added.

FIG. 7 is a pictorial representation of a sorted summary table, sorted in accordance with another embodiment of the present invention. In this example, the category of Model 706 was selected for sorting. In particular, the category Model 706 was selected to be sorted based on the related category of Color 707. However, in contrast to the sorting performed and represented by FIG. 6, in this embodiment the other categories included in the sorted summary table 750 are not disjoined. For example, the structure of the category Class 703 is maintained and the selected category of Model 706 is sorted by the category color 707 within that structure. As can be seen by a comparison of the summary table 450 represented in FIG. 4 and the sorted summary table 750 represented in FIG. 7, the organization of the displayed information is modified based on information contained in the related category Color 707; however, the other related categories (e.g., Class) have not been altered.

Similar to the example described with respect to FIG. 6, sorting may be performed for a category in the summary table based on related categories that are not displayed in the summary table. For example, the category Model 706 can be sorted based on the related category of Manufacturing Costs 111, a non-displayed related category by selecting Model—Manufacturing Cost from a drop down window similar to that illustrated in FIG. 5.

Additionally, a user may select to sort categories based on multiple related categories. In such an example, the sorting is performed on a priority basis. In one example, the priority is assigned based on the order in which the categories are specified for sorting. For example, the sort and/or related category identified first may be given the first priority and each subsequent sort or related category is sorted in the order in which it was added.

Figure 8:
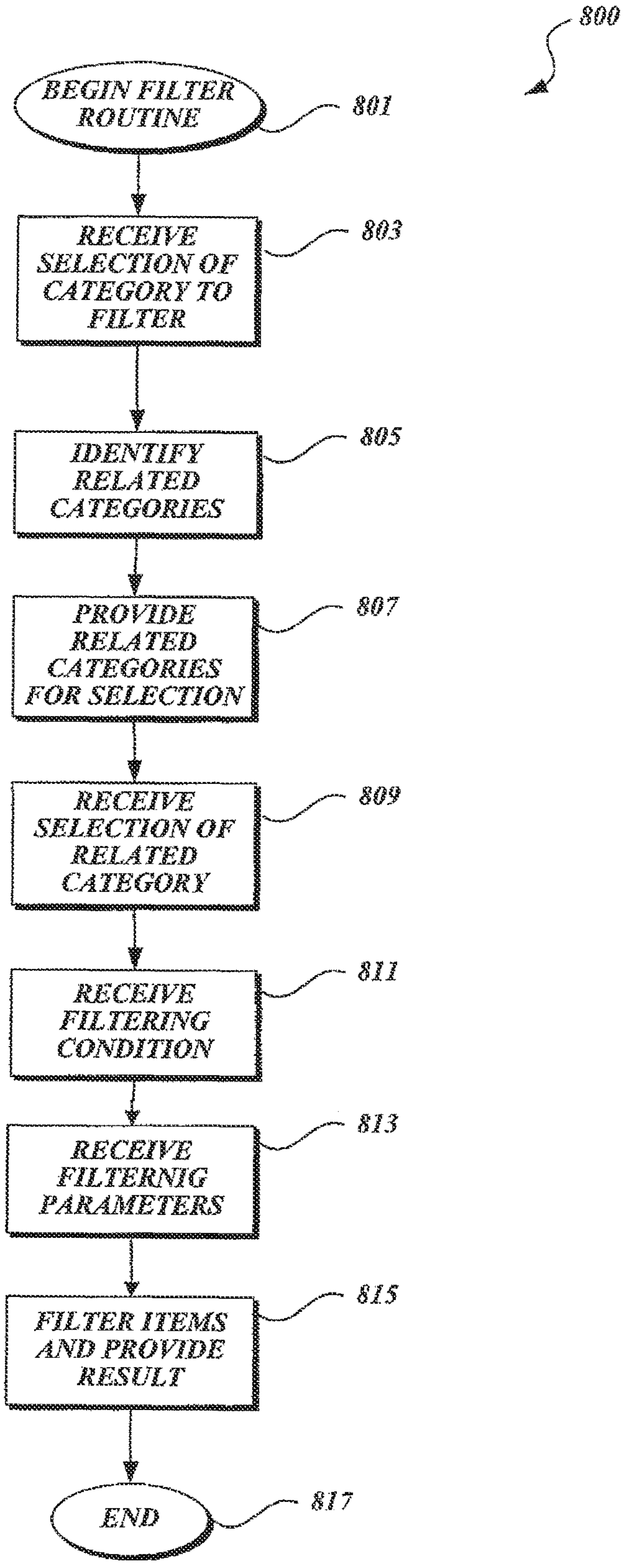
FIG. 8 is a flow diagram of a filter routine for filtering categories of information based on information contained in related categories, in accordance with an embodiment of the present invention.

FIG. 8 is a flow diagram of a filter routine for filtering categories of information based on information contained in related categories, in accordance with an embodiment of the present invention. The filter routine 800 begins at block 801 and at block 803 a selection of a category for which filtering is to be performed is received. As discussed above, filtering may be performed on a summary table that includes a select group of categories from a dataset. Upon selection of a category for which filtering is to be performed, at block 805 all categories related to the category identified at block 803 are identified.

Related categories may be manually selected or automatically determined. For example, related categories may be automatically identified based on header names given to different columns of information in the dataset from which the summary table was generated. Referring back to FIG. 1, the category Product Name 101 has related categories of Class 103, Model Series 105, Model 106, Color 107, Days to Manufacture 109, Manufacturing Cost 111, Dealer Price 113, Volume 115, Profit 117, and End Date 119. These related categories may be automatically identified because they are the headers of the different columns in the dataset 100. Alternatively, a user may specify which items of information are to be considered related categories. In another embodiment, related categories may be identified based upon existing entity relationships between the selected field and fields of the same and/or different datasets. Any type of data or other information may be specified as a related category.

Upon identification of related categories, at block 807 a list of the related categories is provided to a user for selection to identify what related category is to be used for filtering the category selected at block 803. FIGS. 2A and 2B illustrate one example of a technique for displaying a list of related categories. In particular, the drop down window 210 provides a user with an identification of the category selected at block 803 and an identification of all related categories.

At block 809 a selection of a related category is received via interaction with the filter window 200 (FIGS. 2A and 2B). At block 811, a selection of a filtering condition is received. The filtering condition specifies the type of filtering to be performed on the category identified at block 803 according to the related category. As noted above, the filtering conditions include but are not limited to: equals, does not equal, is greater than, is greater than or equal to, is less than, is less than or equal to, begins with, does not begin with, ends with, does not end with, contains, does not contain, is between, and is not between.

In addition to receiving the filtering condition at block 811, at block 813, the filtering parameters that are to be used with the filtering condition for filtering the information is received. The filtering parameters are provided in accordance with the filtering condition selected at block 811. For example, if a user selected the filtering condition of "contains," the user may provide characters that are to be searched for in the selected related category. Any type of searching technique may be used in accordance with the filtering routine 800. For example, a string search, wild card search or query search may be performed. Additionally, a user may search, for example, by a particular data/time (or range of dates/times), a numeric value or range, etc.

At block 815, upon selection of a category, an identified related category for filtering, a filtering condition, and filtering parameters, the filtering is performed and the results are provided to a user. As discussed above, filtering of a selected category is performed based on information contained in a related category. The filtering routine 800 completes at block 817.

The filtering routine 800 may be performed on a data summary table any number of times. In an example where multiple filters are being applied to the same set of information, the filtering may be performed in a priority order. In one example, the priority may be assigned based on the order in which the filtering is specified. For example, filtering that is provided first may be given the highest priority and all subsequently provided filters may be applied to the information in the order in which they were received.

Figure 9:
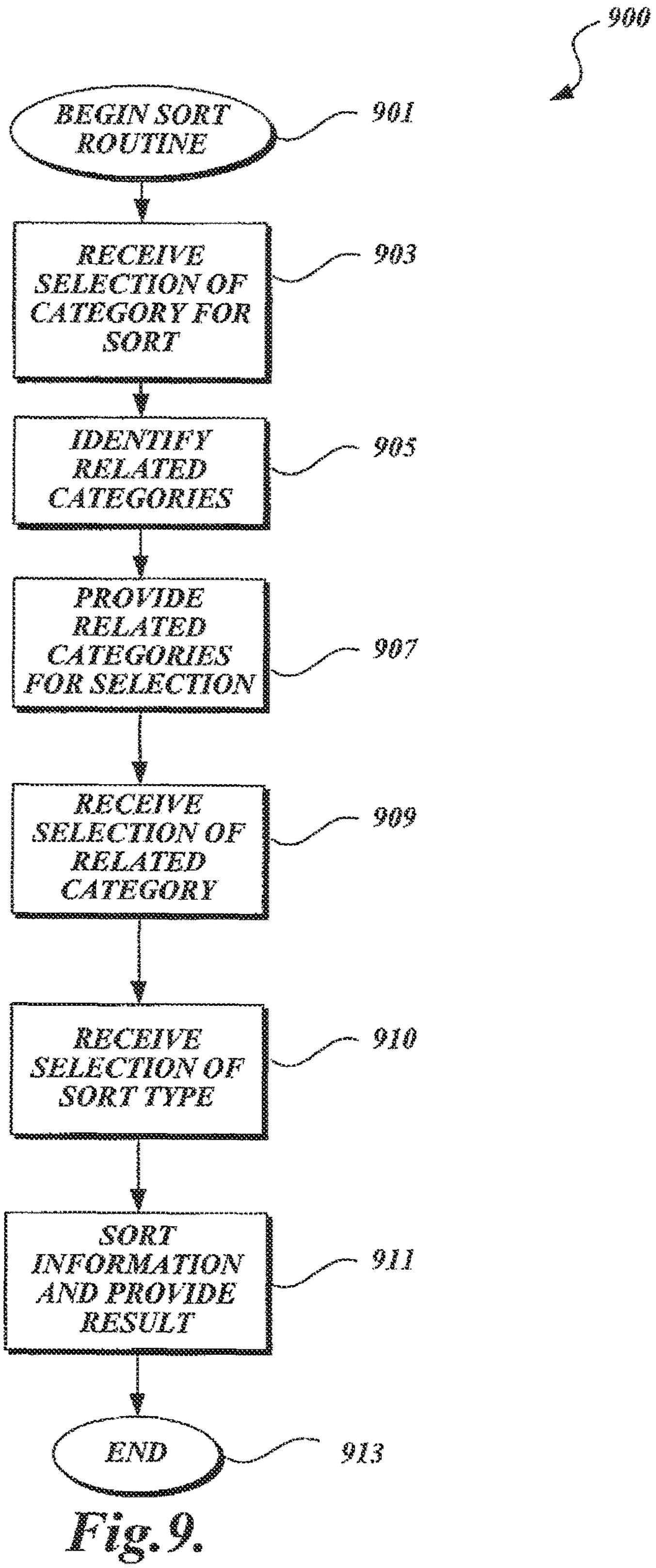
FIG. 9 is a flow diagram of a sort routine for sorting categories of information provided in a summary table based on information contained in related categories, in accordance with an embodiment of the present invention.

FIG. 9 is a flow diagram of a sort routine for sorting categories of information provided in a summary table based on related categories of information that are either included or not included in the summary table, in accordance with an embodiment of the present invention. The sort routine 900 begins at block 901. At block 903 a selection of a category for which sorting is to be performed is received. Upon selection of a category at block 903, at block 905, all related categories are identified. Similar to the filtering routine 800, related categories may be automatically determined and/or provided manually.

At block 907 the related categories identified at block 905 are provided to a user for selection. Referring back to FIG. 5, a user may be provided with a drop down list of categories related to the selected category. In one embodiment, the selected category may be provided at the beginning of the drop down list followed by a hyphen and the related category that may be selected for the sorting. Any other technique for identifying the selected category and the related categories may be used with embodiments of the present invention.

At block 909 a selection of a related category is received and at block 910 the type of sorting to be performed is received. As discussed above, the sorting type can be, for example, based on data source order, manually, ascending, or descending. At block 911, the information provided in a summary table is sorted based on the selected category and sort type, and the results are provided to the user. For example, if a user selects the category Model and the related category Color and requests that a sort be performed in descending order, the category Model is sorted in descending order based on information contained in the related category Color, as illustrated in FIG. 7. The sort routine 900 completes at block 913.

The embodiments described above may be implemented on a stand-alone computing device or as part of a networked environment in which some or all of the datasets, information used to generate summary tables, and/or related categories used to filter or sort summary tables is obtained from or computed by other networked computing devices.

Figure 10A:
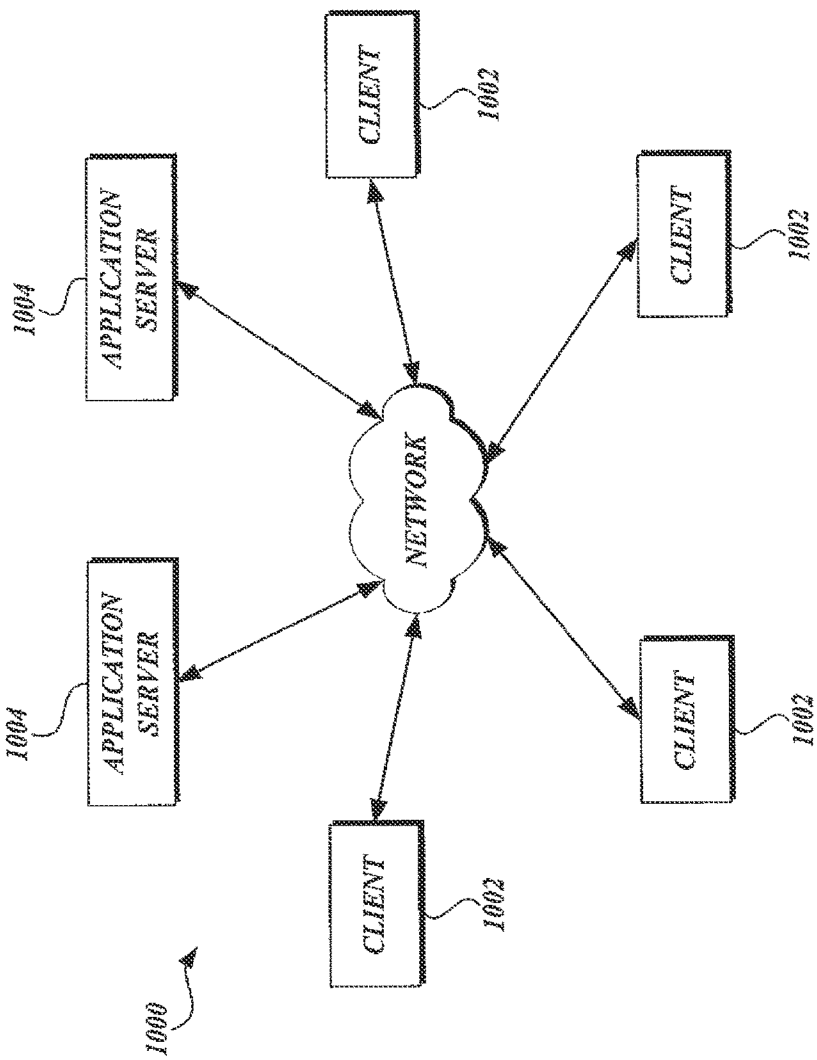
FIGS. 10A and 10B are block diagrams illustrative of a network environment for providing a network-based user interface in accordance with an aspect of the present invention.
Figure 10B:
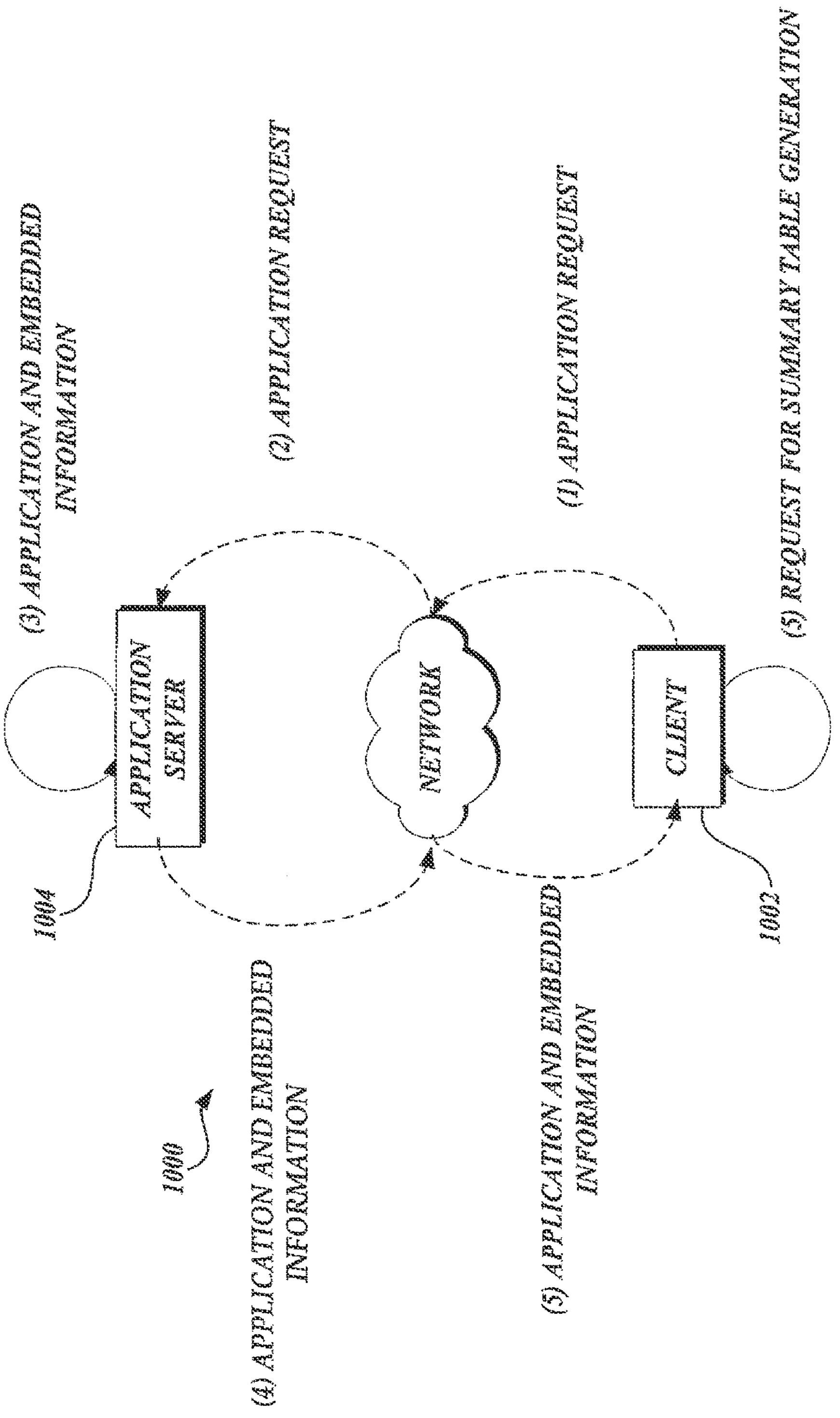

With reference now to FIGS. 10A and 10B, an illustrative networked operating environment 1000 will be described. With reference to FIG. 10A, the operating environment 1000 includes a plurality of receiving computing devices, such as client computing devices 1002, that can communicate via a communication network such as the Internet or an intranet. In an illustrative embodiment, the client computing devices 1002 can include a software application such as a browser software application to facilitate communication via the network. The operating environment also includes one or more sending computing devices, such as an application server 1004, that communicate with the client computing devices 1002. The application servers 1004 can provide the summary tables (normally, filtered, and/or sorted) to the client computing devices 1002. One skilled in the relevant art will appreciate that the client computing device 1002 and/or application servers 1004 can correspond to a variety of computing devices such as personal computers, hand-held computers, mobile computers, mobile telephones, server computers, and the like.

With reference to FIG. 10B, in an illustrative embodiment, the client computing devices 1002 can generate a request for a summary table application via the communication network. The application request is received at an appropriate application server 1004, which generates or otherwise retrieves the appropriate code to generate the summary table on the client computing device. The code or the summary table itself is then transmitted to the client computing device 1002.

While illustrative embodiments have been illustrated and described, it will be appreciated that various changes can be made therein without departing from the spirit and scope of the invention.

What is claimed is:

1. A method for filtering data, the method comprising:

performing a calculation utilizing selected data of a dataset;

generating a spreadsheet summary table based on the calculation that utilized the selected data of the dataset wherein the spreadsheet summary table displays a select group of categories of information generated from the dataset;

displaying the spreadsheet summary table for analyzing the selected data of the dataset;

receiving a selection of a displayed category of information from the spreadsheet summary table;

in response to receiving the selection of the displayed category of information from the spreadsheet summary table, identifying at least one related category not included in the spreadsheet summary table but contained within the dataset and related to the selected displayed category for filtering the information of the spreadsheet summary table;

receiving a selection of the at least one related category for filtering the information of the spreadsheet summary table;

in response to receiving the selection of the at least one related category, filtering the information of the spreadsheet summary table such that the information of the spreadsheet summary table is manipulated based on the dataset rather than on the information provided in the spreadsheet summary table; and displaying a filtered spreadsheet summary table.

2. The method of claim 1, wherein identifying the at least one related category comprises identifying the at least one related category that is an undisplayed sub-category of the selected displayed category.

3. The method of claim 1, wherein identifying the at least one related category comprises identifying the at least one related category automatically.

4. The method of claim 1, wherein providing the spreadsheet summary table comprises providing the spreadsheet summary table comprising the group of categories associated with a first dataset within a first database.

5. The method of claim 4, wherein identifying the at least one related category comprises identifying the at least one related category belonging to a second dataset within a second database.

6. The method of claim 5, wherein identifying the at least one related category comprises tracking at least one existing entity relationship between the first dataset and the second dataset.

7. The method of claim 1, wherein identifying the at least one related category comprises identifying the at least one related category based on at least one column header of the spreadsheet summary table.

8. The method of claim 1, wherein receiving the filtering criteria further comprises receiving selections for filtering conditions along with the at least one related category.

9. The method of claim 1, wherein filtering the selected displayed category comprises filtering the information on a priority basis.

10. A computer-readable storage device having a set of instructions which when executed performs a method of filtering data, the method comprising:

performing a calculation utilizing selected data of a dataset;

generating a summary table based on the calculation that utilized the selected data of the dataset;

displaying a set of categories of information in the summary table for analyzing the selected data of the dataset;

receiving a selection of one displayed category of information of the displayed set of categories;

identifying, in response to the received selection, a plurality of related categories not included in the summary table but related to the selected displayed category contained within the dataset for filtering the information of the summary table;

receiving a selection of at least one related category for filtering the information of the summary table;

in response to receiving the selection of the at least one related category, filtering the information of the summary table such that the information of the summary table is manipulated based on the dataset rather than on the information provided in the summary table; and displaying a filtered summary table.

11. The computer-readable storage device of claim 10, wherein identifying the plurality of related categories comprises identifying the plurality of related categories not initially displayed within the summary table.

12. The computer-readable storage device of claim 10, wherein identifying the plurality of related categories comprises identifying the plurality of related categories comprising undisplayed sub-categories of the selected displayed category.

13. The computer-readable storage device of claim 10, wherein receiving the selection of the displayed category comprises receiving the selection of the displayed category displayed in a first dataset within a first database.

14. The computer-readable storage device of claim 13, wherein identifying the plurality of related categories comprises identifying the plurality of related categories belonging to a second dataset within a second database.

15. The computer-readable storage device of claim 14, wherein identifying the plurality of related categories comprises tracking at least one existing entity relationship between the first dataset and the second dataset.

16. The computer-readable storage device of claim 10, wherein identifying the plurality of related categories comprises identifying the plurality of related categories based on at least one column header of the summary table.

17. The computer-readable storage device of claim 10, further comprising receiving filtering criteria selections for specifying filtering conditions to be applied to the at least one related category.

18. The computer-readable storage device of claim 10, wherein filtering the selected displayed category comprises filtering the information on a priority basis.

19. A system for filtering data, the system comprising:

a memory storage; and a processing unit coupled to the memory storage, the processing unit being configured to:

perform a calculation utilizing selected data of a dataset;

generate a summary table based on the calculation that utilized the selected data of the dataset wherein the summary table comprising a set of categories of information generated from the dataset, display the summary table for analyzing the selected data of the dataset, receive a selection of a category of information within the summary table, identify, in response to the received selection, at least one related category of information not included in the summary table for filtering the information of the summary table wherein the at least one related category of information is contained within the dataset and is related to the selected category of information, receive a selection of the at least one related category for filtering the information of the summary table, in response to receiving the selection of the at least one related category, filter the information of the summary table such that the information of the summary table is manipulated based on the dataset rather than on the information provided in the summary table, and display a filtered summary table.

* * * * *